Nov. 30, 1926.  
J. C. GREENWAY  
1,608,557  
FURNACE FOR MELTING METALS  
Filed July 22, 1925
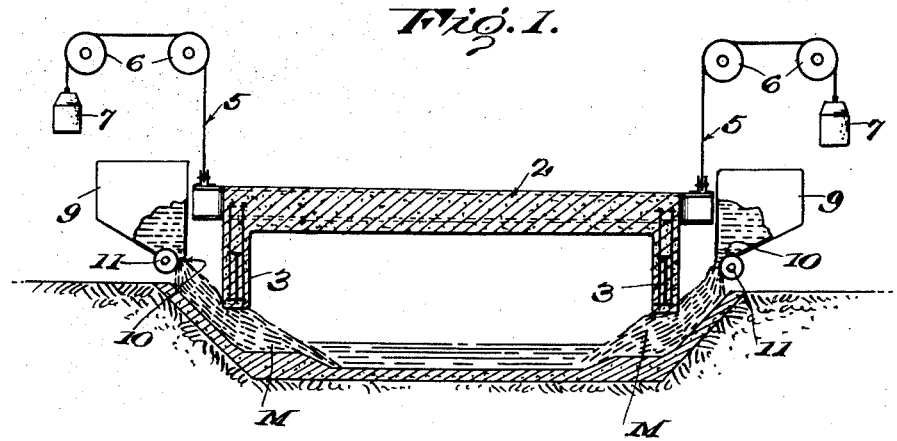
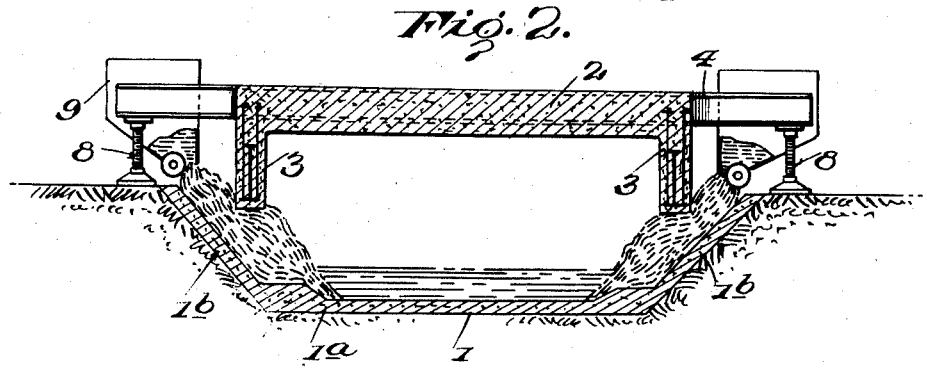
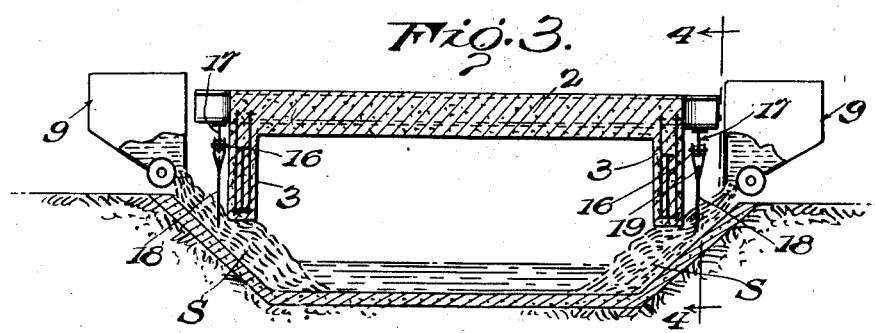
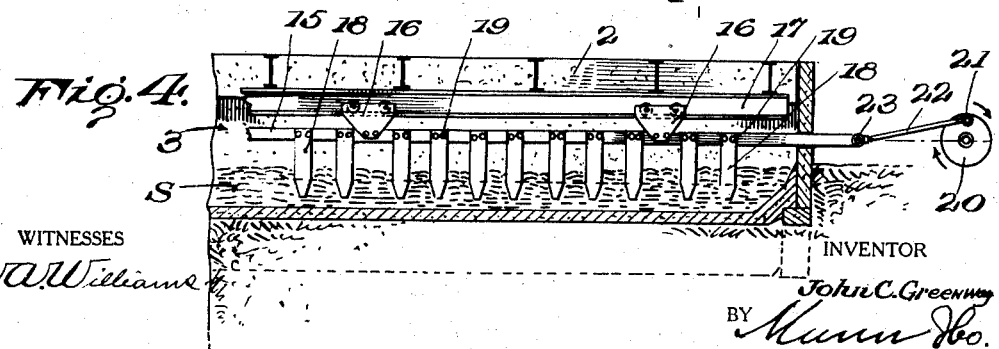
WITNESSES  
W. A. Williams
INVENTOR  
John C. Greenway  
BY Munn & Co.  
ATTORNEYS Patented Nov. 30, 1926.

1,608,557

UNITED STATES PATENT OFFICE.

JOHN C. GREENWAY, OF AJO, ARIZONA; ISABELLA GREENWAY AND LOUIS D. RICKETTS EXECUTORS OF SAID JOHN C. GREENWAY, DECEASED.

FURNACE FOR MELTING METALS.

Application filed July 22, 1925. Serial No. 45,394.

My invention relates to furnaces for the melting of metals and the smelting of copper, iron, silver, gold and other ores, and relates especially, though not wholly, to open hearth furnaces in which there is a constant deterioration of the side walls thereof.

Prior to my invention it was customary to charge furnaces of this character either through the roof or through the side walls, either of which procedures weakened the structure of the furnace producing shorter life thereof, and also caused excess dust losses containing values in that the fine ore was dropped directly across the air currents passing through the furnace and was partly carried off in the waste gases.

In carrying out my invention I arrange bins contiguous and alongside the furnace, in which bins are placed the materials to be charged. These materials pass into the furnace by being fed into an oversize hearth (meaning a hearth which extends well beyond the side walls and roof of the furnace) outside the furnace side walls and thence underneath the pendant side walls thereof, either mechanically or otherwise to form a hearth or troughed furnace bottom consisting of the materials themselves. My pendant side walls stop short of the slag line and scorifying action at and below that point is avoided. My adjustable roof which may be either suspended or carried on supports outside of the furnace walls proper permits the raising or lowering of the furnace roof, thereby allowing niceties of adjustment of arch space above the ore bath which are productive of fuel and metallurgical savings, and also permits ready access to the furnace for repairs, inspection and the like.

Other objects and advantages reside in certain novel features of the construction, arrangement and combination of parts which will be hereinafter more fully described and particularly pointed out in the appended claims, reference being had to the accompanying drawings forming a part of this specification, and in which;

Figure 1 is a diagrammatic view partly in transverse section showing a furnace constructed in accordance with the present invention and illustrating one form of means for supporting the roof, Figure 2 is a similar view illustrating another form of supporting means, Figure 3 is a diagrammatic view, partly in transverse section, illustrating a mechanical feeding or rabbling device that may be employed, Figure 4 is a view in longitudinal vertical section on the line 4—4 of Figure 3.

Referring to the drawings it will be seen that the invention in all of its embodiments comprises an oversize hearth having a bottom $1^a$ and upwardly and outwardly inclined extensions $1^b$. The roof of the furnace is designated generally at 2 and carries pendant side walls 3 which terminate above the slag line of the furnace and in spaced relation to the oversize hearth 1. The side walls 3 are located within the limits of the hearth, as shown in the drawings. The roof and side walls may be constructed of brick or any refractory material and are supported by means of I-beams 4 embodied in the structure of the roof and supported in any suitable way. In Fig. 1 the I-beams 4 are shown as suspended on cable 5 trained over supporting guide sheaves 6 and having counterweights 7 secured thereto so as to maintain the roof and side walls in any vertical adjustment.

In lieu of the cables 5, pulleys 6 and counterweights 7 the beams 4 may be supported on jacks 8, as illustrated in Fig. 2 or in any other manner.

Along the extensions $1^b$ of the hearth of the furnace hoppers of bins 9 are arranged. The hoppers 9 contain the material with which the furnace is to be charged and in their lower portions these hoppers 9 are formed with discharge openings 10 through which the material is fed by feeding rollers 11. The material after leaving the hoppers slides down the extensions $1^b$ of the hearth and under the lower ends of the pendant side walls 3. The space between the lower ends of the side walls 3 and the hearth is filled with the material used to charge the furnace, the material building up into a mass M which seals the space between the lower ends of the side walls of the hearth and which affords a protective bulk of charging material between the molten mass and the adjacent portions of the hearth. It is to be noted that the side walls terminate above the slag line and as a consequence of this arrangement deterioration of the side walls is absolutely precluded. Moreover, the material to be charged being fed underneath the side walls and laterally into the furnace does not cross or traverse the path of the air currents or products of combustion travelling lengthwise of the furnace between the roof and molten mass. The space between the roof of the furnace, the molten mass and the side walls is left substantially unobstructed and no charging material traverses across this space. This has the very material advantage of retaining in the charging material all of the finer particles or dust-containing values and of preventing these finer particles or dust from being entrained in the air currents or products of combustion and of being carried out of the furnace and consequently lost. With this in mind it will now be understood that the feeding of the charging material underneath the side walls has distinct and substantial advantages over the previous practice of feeding this charging material through the roof or through the side walls.

If desired mechanical feeding and agitating means may be provided for forcing the material down through the charging spaces S which are defined by the lower end of the side walls and the underlying portions of the hearth. This mechanical feeding and rabbling means may take any conventional or standard form. One form of such means is shown in Figs. 3 and 4 and comprises longitudinal bars 15 extending longitudinally of the furnace at each side. Each bar is mounted for reciprocatory movement by means of roller assemblies 16, the rollers of which engage tracks 17 carried by the I-beams 4. A plurality of tines 18 are provided for each bar 15, each tine having its upper end fastened, as at 19, to its bar. The tines extend down into the mass of material being fed into the furnace and these tines are preferably twisted so that when they move back and forth they will exert a thrust on the material and tend to force it into the furnace as well as break it up and keep it in a fluent condition which will permit gravity to cause the material to flow into the furnace as it is needed. It is to be understood at this point, however, that the invention contemplates mechanical means for positively feeding the material into the furnace as well as a gravity feeding and in fact the twisting of the tines provides one means for effecting such a positive feeding.

Means is provided for reciprocating the bars 12 and many comprise crank discs 20 located in any suitable manner and having crank pins 21 to which pitmen 22 are connected, the pitmen 22 also being pivotally connected to the bars 15, as indicated at 23.

I claim the following:

1. A furnace adapted for use in melting metals, ores and other materials and comprising an oversize hearth and a roof having pendant side walls, the lower ends of the side walls overlying the hearth in spaced relation thereto and terminating above the slag line of the furnace, the lower ends of the side walls and the hearth defining between them charging spaces opening into the furnace below the side walls, and means for raising and lowering the side walls and roof and supporting the same in any vertical adjustment.

2. A furnace for use in melting metals, ores and other materials having a hearth provided with upwardly and outwardly extending extensions and a roof having pendant side walls overlying the extensions in spaced relation thereto, the hearth and the lower ends of the walls defining openings leading into the furnace underneath the side walls, means for supporting the roof and side walls, and means for supplying material to be charged to the extensions of the hearth to permit the same to flow by gravity through the charging openings and underneath the side walls so that the material to be charged seals the openings between the side walls and the extensions of the hearth.

3. A furnace for use in melting metals, ores and other materials having a hearth provided with upwardly and outwardly extending extensions and a roof having pendant side walls overlying the extensions in spaced relation thereto, the hearth and lower ends of the walls defining openings leading into the furnace underneath the side walls, means for supporting the roof and side walls, means for supplying material to be charged to the extensions of the hearth to permit the same to flow by gravity through the charging openings and underneath the side walls so that the material to be charged seals the openings between the side walls and the extensions of the hearth, and means for causing the material to feed into the furnace through the charging openings.

4. A furnace for use in melting metals, ores or other materials having a hearth provided with upwardly and outwardly extending extensions and a roof having pendant side walls overlying the extensions in spaced relation thereto, the hearth and lower end walls defining openings leading into the furnace underneath the side walls, means for supporting the roof and side walls, means for supplying material to be charged to the extensions of the hearth to permit the same to flow by gravity through the charging openings and underneath the side walls so that the material to be charged seals the openings between the side walls and the extensions of the hearth, means for causing the material to feed into the furnace through the charging openings and comprising rakes at the sides of the furnace, means for reciprocating the rakes, each rake having twisted tines extending down into the material and adapted to break up the material and force the material into the furnace as the rakes are reciprocated.

5. A furnace adapted for use in melting metals, ores and other materials and comprising a hearth, a roof, side walls extending downwardly from the roof and terminating above and in spaced relation to the hearth, the lower ends of the side walls overlying the hearth and co-acting therewith to define charging spaces opening into the furnace below and beneath the side walls.

6. A furnace adapted for use in melting metals, ores and other materials and comprising an oversize hearth and a roof having downwardly extending side walls supported thereon, the lower ends of the side walls overlying the hearth in spaced relation thereto and terminating above the slag line of the furnace, the lower ends of the side walls and the underlying portions of the hearth defining between them charging spaces opening into the furnace below the side walls.

JOHN C. GREENWAY.